US012293766B2

(12) United States Patent
Norvell et al.

(10) Patent No.: US 12,293,766 B2
(45) Date of Patent: *May 6, 2025

(54) TIME REVERSED AUDIO SUBFRAME ERROR CONCEALMENT

(71) Applicant: Telefonaktiebolaget LM Ericsson (publ), Stockholm (SE)

(72) Inventors: Erik Norvell, Upplands Väsby (SE); Chamran Moradi Ashour, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/608,303

(22) Filed: Mar. 18, 2024

(65) Prior Publication Data

US 2024/0221760 A1 Jul. 4, 2024

Related U.S. Application Data

(63) Continuation of application No. 17/618,676, filed as application No. PCT/EP2020/064394 on May 25, 2020, now Pat. No. 11,967,327.

(Continued)

(51) Int. Cl.

*G10L 19/005* (2013.01)
*G10L 19/022* (2013.01)
*G10L 19/06* (2013.01)

(52) U.S. Cl.

CPC .......... *G10L 19/005* (2013.01); *G10L 19/022* (2013.01); *G10L 19/06* (2013.01)

(58) Field of Classification Search

CPC ..... G10L 19/005; G10L 19/022; G10L 19/06; G10L 19/09; G10L 25/21; H04L 65/403

See application file for complete search history.

(56) References Cited

U.S. PATENT DOCUMENTS 8,346,546 B2 * 1/2013 Chen .................... G10L 19/005 704/218
9,280,976 B2 3/2016 Vasilache et al.

(Continued)

FOREIGN PATENT DOCUMENTS

CN 104011793 A 8/2014
CN 109155133 A 1/2019

(Continued)

OTHER PUBLICATIONS

Office Action for Chinese Patent Application No. 202080042683.0 dated Sep. 15, 2024, 7 pages.

(Continued)

*Primary Examiner* — Paras D Shah
*Assistant Examiner* — Nadira Sultana
(74) *Attorney, Agent, or Firm* — Sage Patent Group

(57) ABSTRACT

A method and a decoder device of generating a concealment audio subframe of an audio signal are provided. The method comprises generating frequency spectra on a subframe basis where consecutive subframes of the audio signal have a property that an applied window shape of first subframe of the consecutive subframes is a mirrored version or a time reversed version of a second subframe of the consecutive subframes. Peaks of a signal spectrum of a previously received audio signal are detected for a concealment subframe, and a phase of each of the peaks is estimated. A time reversed phase adjustment is derived based on the estimated phase and applied to the peaks of the signal spectrum to form time reversed phase adjusted peaks.

26 Claims, 10 Drawing Sheets

Related U.S. Application Data

(60) Provisional application No. 62/860,922, filed on Jun. 13, 2019.

(56) References Cited

U.S. PATENT DOCUMENTS

| | | | | |
|---|---|---|---|---|
| 9,972,327 | B2 * | 5/2018 | Bruhn | G10L 19/005 |
| 10,381,012 | B2 * | 8/2019 | Lecomte | G10L 19/09 |
| 10,706,858 | B2 | 7/2020 | Lecomte et al. | |
| 11,107,481 | B2 * | 8/2021 | Ullmann | H04L 65/403 |
| 2015/0131429 | A1 | 5/2015 | Liu | |
| 2017/0256266 | A1 * | 9/2017 | Sung | G10L 25/21 |
| 2019/0005967 | A1 | 1/2019 | Lecomte et al. | |
| 2019/0019524 | A1 | 1/2019 | Sung et al. | |
| 2019/0172469 | A1 | 6/2019 | Sung | |
| 2019/0237086 | A1 | 8/2019 | Huang et al. | |
| 2019/0268072 | A1 | 8/2019 | Aoyama et al. | |

FOREIGN PATENT DOCUMENTS

| | | | |
|---|---|---|---|
| EP | 1846920 | A1 | 10/2007 |
| EP | 2922055 | A1 | 9/2015 |
| EP | 2951813 | B1 | 12/2016 |
| EP | 1846920 | B1 | 4/2017 |
| JP | 2015-528923 | A | 10/2015 |
| JP | 2015530622 | A | 10/2015 |
| JP | 2016510432 | A | 4/2016 |
| JP | 2016515725 | A | 5/2016 |
| JP | 2018040917 | A | 3/2018 |
| KR | 20180122660 | A | 11/2018 |
| WO | 2006079348 | A1 | 8/2006 |
| WO | 2014123471 | A1 | 8/2014 |

OTHER PUBLICATIONS

International Search Report and Written Opinion of the International Searching Authority for PCT International Application No. PCT/EP2020/064394, mailed Aug. 17, 2020, 10 pages.

Bruhn Stefan et al: "A novel sinusoidal approach to audio signal frame loss concealment and its application in the new evs codec standard", 2015 IEEE International Conference on Acoustics, Speech and Signal Processing (ICASSP), Brisbane, QLD, 2015, pp. 5142-5146.

3GPP TS 26.447 V12.7.0 (Jun. 2017), 3rd Generation Partnership Project; Technical Specification Group Services and System Aspects; Codec for Enhanced Voice Services (EVS); Error Concealment of Lost Packets (Release 12), pp. 1-82.

Lecomte et al: "Packet-Loss Concealment Technology Advances in EVS", 2015 IEEE International Conference on Acoustics, Speech and Signal Processing (ICASSP), Brisbane, QLD, 2015, pp. 5708-5712.

Vaillancourt et al: "Efficient Frame Erasure Concealment in Predictive Speech Codecs Using Glottal Pulse Resynchronisation", 2007 IEEE International Conference on Acoustics, Speech and Signal Processing—ICASSP '07, Honolulu, HI, 2007, pp. IV-1113-IV-1116.

Japanese Office Action, Japanese Patent Application No. 2021-573331, mailed Feb. 24, 2023, 2 pages.

Examination Report for Indian Patent Application No. 202247001249, mailed Jun. 7, 2022, 6 pages.

Office Action for Japanese Patent Application No. 2023-179369 dated Jan. 28, 2025, including English translation, 7 pages.

* cited by examiner

TIME REVERSED AUDIO SUBFRAME ERROR CONCEALMENT

CROSS REFERENCE TO RELATED APPLICATIONS

This application is a continuation of U.S. patent application Ser. No. 17/618,676 filed on Dec. 13, 2021, which itself is a 35 U.S.C. § 371 national stage application of PCT International Application No. PCT/EP2020/064394 filed on May 25, 2020, which in turns claims domestic priority to U.S. Provisional Patent Application No. 62/860,922 filed on Jun. 13, 2019, the disclosures and content of which are incorporated by reference herein in their entirety.

TECHNICAL FIELD

The present disclosure relates generally to communications, and more particularly to methods and apparatuses for controlling a packet loss concealment for mono, stereo or multichannel audio encoding and decoding.

BACKGROUND

Modern telecommunication services generally provide reliable connections between the end users. However, such services still need to handle varying channel conditions where occasional data packets may be lost due to e.g. network congestion or poor cell coverage. To overcome the problem of transmission errors and lost packages, telecommunication services may make use of Packet Loss Concealment techniques (PLC). In the case that data packets are lost due to poor connection, network congestion, etc., the missing information of lost packets in the receiver side may be substituted in the decoder by a synthetic signal. PLC techniques may often be tied closely to the decoder, where the internal states can be used to produce a signal continuation or extrapolation to cover the packet loss. For a multi-mode codec having several operating modes for different signal types, there are often several PLC technologies to handle the concealment. There are many different terms used for the packet loss concealment techniques, including Frame Error Concealment (FEC), Frame Loss Concealment (FLC), and Error Concealment Unit (ECU).

For linear prediction (LP) based speech coding modes, the PLC may be based on adjustment of glottal pulse positions using estimated end-of-frame pitch information and replication of pitch cycle of the previous frame [1]. The gain of the long-term predictor (LTP) converges to zero with the speed depending on the number of consecutive lost frames and the stability of the last good, i.e. error free, frame [2]. Frequency domain (FD) based coding modes are designed to handle general or complex signals such as music. Different techniques may be used depending on the characteristics of last received frame. Such analysis may include the number of detected tonal components and periodicity of the signal. If the frame loss occurs during a highly periodic signal such as active speech or single instrumental music, a time domain PLC, similar to the LP based PLC, may be suitable. In this case the FD PLC may mimic an LP decoder by estimating LP parameters and an excitation signal based on the last received frame [2]. In case the lost frame occurs during a non-periodic or noise-like signal, the last received frame may be repeated in spectral domain where the coefficients are multiplied to a random sign signal to reduce the metallic sound of a repeated signal. For a stationary tonal signal, it has been found advantageous to use an approach based on prediction and extrapolation of the detected tonal components. More details about the above-mentioned techniques can be found in [1][2][3].

A generic error concealment method operating in the frequency domain is the Phase ECU (Error Concealment Unit) [4]. The Phase ECU is a stand-alone tool operating on a buffer of the previously decoded and reconstructed time domain signal. The framework of the Phase ECU is based on the sinusoidal analysis and synthesis paradigm. In this method, the sinusoid components of the last good frame may be extracted and phase shifted. When a frame is lost, the sinusoid frequencies are obtained in DFT (discrete Fourier transform) domain from the past decoded synthesis. First, the corresponding frequency bins are identified by finding the peaks of the magnitude spectrum plane. Then, fractional frequencies of the peaks are estimated using peak frequency bins. The frequency bins corresponding to the peaks along with the neighbours are phase shifted using fractional frequencies. For the rest of the frame the magnitude of the past synthesis is retained while the phase is randomized. The burst error is also handled such that the estimated signal is smoothly muted by converging it to zero. More details on the Phase ECU can be found in [4].

The concept of the Phase ECU may be used in decoders operating in frequency domain. This concept includes encoding and decoding systems which perform the decoding in frequency domain, as illustrated in FIG. 1, but also decoders which perform time domain decoding with additional frequency domain processing as illustrated in FIG. 2. In FIG. 1, the time domain input audio signal (sub)frames are windowed 100 and transformed to frequency domain by DFT 101. An encoder 102 performs encoding in frequency domain and provides encoded parameters for transmission 103. A decoder 104 decodes received frames or applies PLC 109 in case a frame loss. In the construction of the concealment frame, the PLC may use a memory 108 of previously decoded frames. The decoded or concealed frame is transformed to time domain by inverse DFT 110, and the output audio signal is then reconstructed by overlap-add operation 111. FIG. 2 illustrates an encoder and decoder pair where the decoder applies a DFT transform to facilitate frequency domain processing. Received and decoded time domain signal is first (sub)frame wise windowed 105 and then transformed to frequency domain by DFT 106 for frequency domain processing 107 that may be done either before or after PLC 109 (in case a frame loss).

Since a frequency domain spectrum is already produced for each frame, the raw material for the Phase ECU can easily be obtained by simply storing the last decoded spectrum in memory. However, if the decoded spectra correspond to frames of the time domain signal with different windowing functions (see FIG. 1), the efficiency of the algorithm may be reduced. This can happen when the decoder divides the synthesis frames into shorter subframes, e.g. to handle transient sounds which require higher temporal resolution. In order to achieve good results, the ECU should produce the desired window shape for each frame, or there may be transition artefacts at each frame boundary. One solution is to store the spectrum of each frame corresponding to a certain window and apply the ECU on them individually. Another solution could be to store a single spectrum for the ECU and correct the windowing in time domain. This may be implemented by applying an inverse window and then reapplying a window with the desired shape. These solutions have some drawbacks that are discussed below.

One drawback with applying the frequency domain ECU on individual subframes is that there may be differences between the subframes which will be replicated for each subframe during the lost frame. For consecutive frame losses, this may lead to a repetitious artefact since each subframe may have a slightly different spectral signature. Another problem is that memory requirement is increased, since a spectrum of each subframe needs to be stored.

The window re-dressing solution where the windowing is inversed and reapplied, overcomes the issue of the different spectral signatures since the ECU may be based on a single subframe. However, applying the inverted window and applying a new window involves a division and a multiplication for each sample, where the division is a computationally complex operation and computationally expensive. This solution could be improved by storing a pre-computed re-dressing window in memory, but this would increase the required table memory. In case the ECU is applied on a subpart of the spectrum, it may further require that the full spectrum is re-dressed since the full spectrum needs to have the same window shape.

SUMMARY

According to a first aspect, a method is proved to generate a concealment audio subframe of an audio signal in a decoding device. The method comprises generating frequency spectra on a subframe basis where consecutive subframes of the audio signal have a property that an applied window shape of first subframe of the consecutive subframes is a mirrored version or a time reversed version of a second subframe of the consecutive subframes. The method further comprises detecting peaks of a signal spectrum of a previously received audio signal on a fractional frequency scale, estimating a phase of each of the peaks and deriving a time reversed phase adjustment to apply to the peaks of the signal spectrum based on the estimated phase to form time reversed phase adjusted peaks. The method further comprises applying a time reversal to the concealment audio subframe.

A potential advantage provided is that a multi-subframe ECU is generated from a single subframe spectrum by applying a reversed time synthesis. This generating may be suited for cases where the subframe windows are time reversed versions of each other. Generating all ECU frames from a single stored decoded frame ensures that the subframes have a similar spectral signature, while keeping the memory footprint and computational complexity at a minimum.

According to a second aspect, a decoder device configured to generate a concealment audio subframe of an audio signal is proved. The decoder device is configured to generate frequency spectra on a subframe basis where consecutive subframes of the audio signal have a property that an applied window shape of first subframe of the consecutive subframes is a mirrored version or a time reversed version of a second subframe of the consecutive subframes. The decoder device is further configured to detect peaks of a signal spectrum of a previously received audio signal on a fractional frequency scale and to estimate a phase of each of the peaks. The decoder device is further configured to derive a time reversed phase adjustment to apply to the peaks of the signal spectrum based on the estimated phase and to form time reversed phase adjusted peaks by applying the time reversed phase adjustment to the peaks of the signal spectrum. The decoder device is further configured to apply a time reversal to the concealment audio subframe.

According to a third aspect, a computer program is provided. The computer program comprises program code to be executed by processing circuitry of a decoder device configured to operate in a communication network, whereby execution of the program code causes the decoder device to perform operations according to the first aspect.

According to a fourth aspect, a computer program product is provided. The computer program product comprises a non-transitory storage medium including program code to be executed by processing circuitry of a decoder device configured to operate in a communication network, whereby execution of the program code causes the decoder device to perform operations according to the first aspect.

According to a fifth aspect, a method is provided to generate a concealment audio subframe for an audio signal in a decoding device. The method comprises generating frequency spectra on a subframe basis where consecutive subframes of the audio signal have a property that an applied window shape of first subframe of the consecutive subframes is a mirrored version or a time reversed version of a second subframe of the consecutive subframes. A signal spectrum corresponding to a second subframe of a first two consecutive subframes is stored. The method further comprises receiving a bad frame indicator for a second two consecutive subframes. The method further comprises obtaining the signal spectrum, detecting peaks of the signal spectrum on a fractional frequency scale, estimating a phase of each of the peaks and deriving a time reversed phase adjustment to apply to the peaks of the spectrum stored for a first subframe of the second two consecutive subframes based on the estimated phase. The method further comprises applying the time reversed phase adjustment to the peaks of the signal spectrum to form time reversed phase adjusted peaks. The method further comprises applying a time reversal to the concealment audio subframe, combining the time reversed phase adjusted peaks with a noise spectrum of the signal spectrum to form a combined spectrum for the first subframe of the second two consecutive subframes, and generating a synthesized concealment audio subframe based on the combined spectrum.

According to a sixth aspect, a decoder device configured to generate a concealment audio subframe of an audio signal is proved. The decoder device comprises a processing circuitry and a memory operatively coupled with the processing circuitry, wherein the memory includes instructions that when executed by the processing circuitry causes the decoder device to perform operations according to the first or fifth aspect.

According to a seventh aspect, a decoder device is provided. The decoder device is configured to generate a concealment audio subframe of an audio signal, wherein the decoder device is adapted to perform the method according to the fifth aspect.

According to an eighth aspect, a computer program is provided. The computer program comprises program code to be executed by processing circuitry of a decoder device configured to operate in a communication network, whereby execution of the program code causes the decoder device to perform operations according to the fifth aspect.

According to a ninth aspect, a computer program product is provided. The computer program product comprises a non-transitory storage medium including program code to be executed by processing circuitry of a decoder device configured to operate in a communication network, whereby execution of the program code causes the decoder device to perform operations according to the fifth aspect.

BRIEF DESCRIPTION OF THE DRAWINGS

The accompanying drawings, which are included to provide a further understanding of the disclosure and are incorporated in and constitute a part of this application, illustrate certain non-limiting embodiments. In the drawings.

DETAILED DESCRIPTION

The aspects of the present disclosure will now be described more fully hereinafter with reference to the accompanying drawings, in which examples of embodiments are shown. Embodiments may, however, be embodied in many different forms and should not be construed as limited to the embodiments set forth herein. Rather, these embodiments are provided so that this disclosure will be thorough and complete, and will fully convey the scope of present embodiments to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 9:
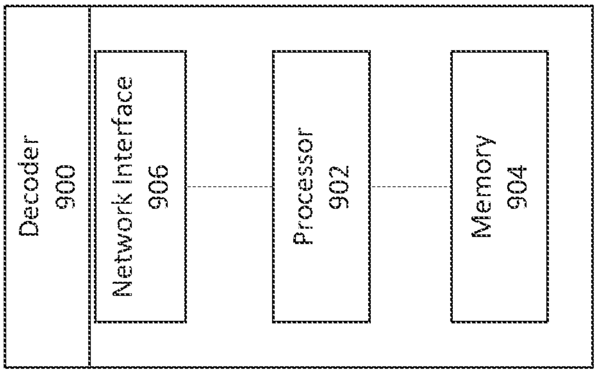
FIG. 9 is a block diagram illustrating a decoder device according to some embodiments.

FIG. 9 is a block diagram illustrating elements of a decoder device 900, which may be part of a mobile terminal, a mobile communication terminal, a wireless communication device, a wireless terminal, a wireless communication terminal, user equipment, UE, a user equipment node/terminal/device, etc., configured to provide wireless communication according to embodiments. As shown, decoder 900 may include a network interface circuit 906 (also referred to as a network interface) configured to provide communications with other devices/entities/functions/etc. The decoder 900 may also include a processor circuit 902 (also referred to as a processor) operatively coupled to the network interface circuit 906, and a memory circuit 904 (also referred to as memory) operatively coupled to the processor circuit. The memory circuit 904 may include computer readable program code that when executed by the processor circuit 902 causes the processor circuit to perform operations according to embodiments disclosed herein.

According to other embodiments, processor circuit 902 may be defined to include memory so that a separate memory circuit is not required. As discussed herein, operations of the decoder 900 may be performed by processor 902 and/or network interface 906. For example, processor 902 may control network interface 906 to transmit communications to multichannel audio players and/or to receive communications through network interface 906 from one or more other network nodes/entities/servers such as encoder nodes, depository servers, etc. Moreover, modules may be stored in memory 904, and these modules may provide instructions so that when instructions of a module are executed by processor 902, processor 902 performs respective operations.

In the description that follows, subframe notation shall be used to describe the embodiments. Here, a subframe denotes a part of a larger frame where the larger frame is composed of a set of subframes. The embodiments described may also be used with frame notation. In other words, the subframes may form groups of frames that have the same window shape as described herein and subframes do not need to be part of a larger frame.

Figure 1:
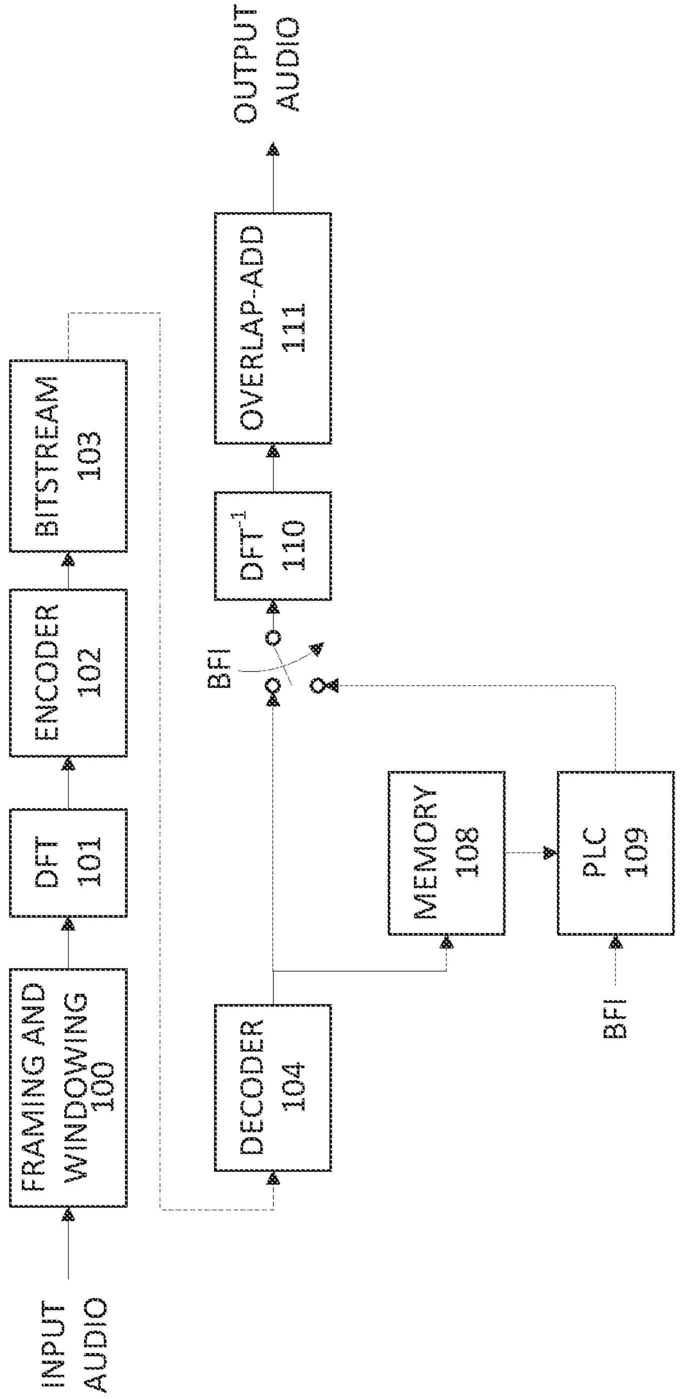
FIG. 1 is a block diagram illustrating an encoder and decoder pair where the encoding is done in DFT domain.
Figure 2:
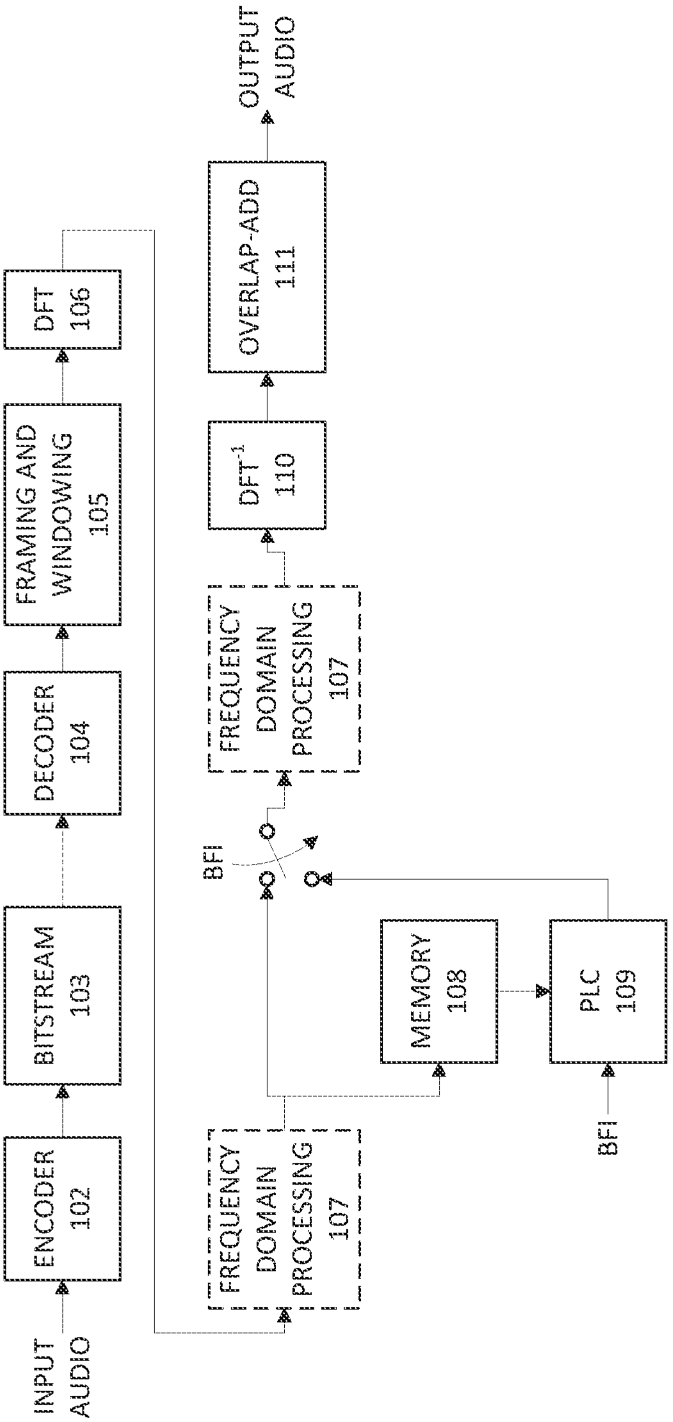
FIG. 2 is a block diagram illustrating an encoder and decoder pair where the decoder applies a DFT transform to facilitate frequency domain processing.
Figure 3:
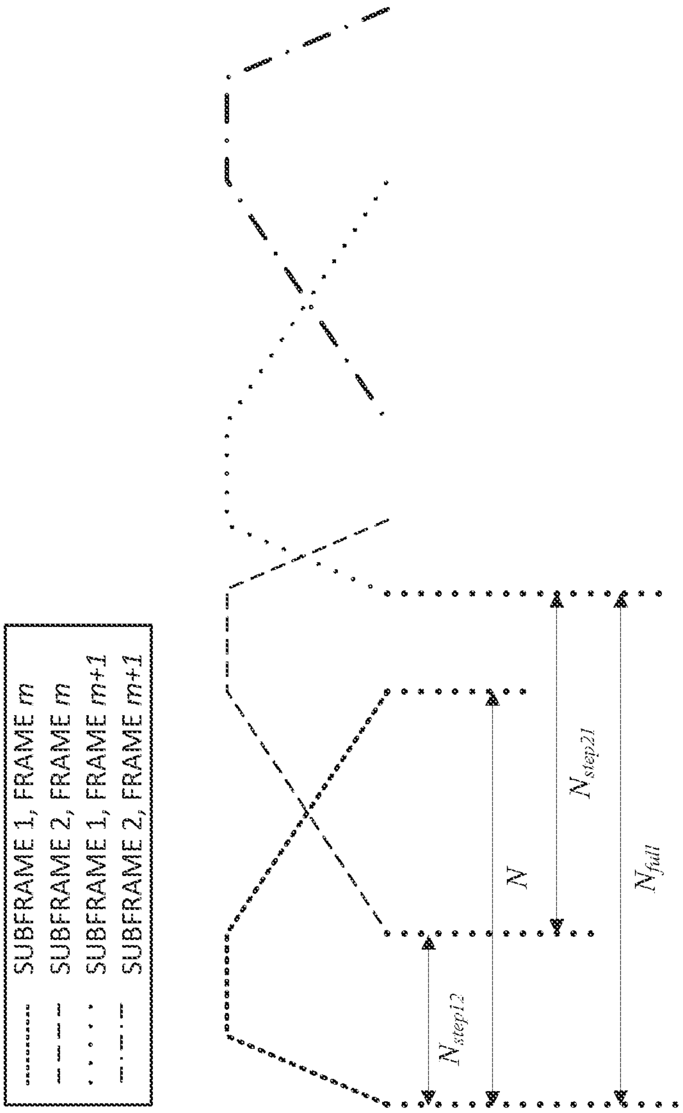
FIG. 3 is an illustration of two subframe windows of a decoder, where the window applied on the second subframe is a time-reversed or mirrored version of the window applied on the first subframe.

Consider a decoder of an encoder and decoder pair where the decoding method generates frequency spectra on a subframe basis. The consecutive subframes may have the property that the applied window shape is mirrored or time reversed versions of each other, as illustrated in FIG. 3, where subframe 2 is a mirrored or time reversed version of subframe 1. The decoder obtains the spectra of the reconstructed subframes $\hat{X}_1(m, k)$, $\hat{X}_2(m, k)$ for each frame m. In an embodiment, the subframe spectra may be obtained from a reconstructed time domain synthesis $\hat{x}(m, n)$, where n is a sample index. The dashed boxes in FIG. 2 indicate that the frequency domain processing may be done either before or after the memory and PLC modules. The spectra may be obtained by multiplying $\hat{x}(m, n)$ with the subframe windowing functions $w_1(n)$ and $w_2(n)$ and applying the DFT transform in accordance with:

$$\hat{X}_1(m, k) = \sum_{n=0}^{N-1} \hat{x}(m, n) w_1(n) e^{-\frac{j2\pi kn}{N}}$$

$$\hat{X}_2(m, k) = \sum_{n=0}^{N-1} \hat{x}(m, n + N_{step12}) w_2(n) e^{-\frac{j2\pi kn}{N}}$$

where N denotes the length of the subframe window and $N_{step12}$ is the distance in samples between the starting point of the first and second subframe. The subframe windowing functions $w_1(n)$ and $w_2(n)$ are mirrored or time reversed versions of each other. Here, the subframe spectra are obtained from a decoder time domain synthesis, similar to the system outlined in FIG. 2. It should be noted that the embodiments are equally applicable for a system where the decoder reconstructs the subframe spectra directly, as outlined in FIG. 1. For each correctly received and decoded audio frame m, the spectrum corresponding to the second subframe $\hat{X}_2(m, k)$ is stored in memory.

$$\hat{X}_{mem}(k) := \hat{X}_2(m, k)$$

For correctly received frames, the decoder device 900 may proceed with preforming the frequency domain processing steps, performing the inverse DFT transform and reconstructing the output audio using an overlap-add strategy. Missing or corrupted frames may be identified by the transport layer handling the connection and is signaled to the decoder as a "bad frame" through a Bad Frame Indicator (BFI), which may be in the form of a flag. When the decoder device 900 detects a bad frame through a bad frame indicator (BFI), the PLC algorithm is activated. The PLC follows the principle of the Phase ECU [4]. The stored spectrum $\hat{X}_{mem}(k)$ is input to a peak detector algorithm that detects peaks on a fractional frequency scale. A set of peaks $$F = \{f_i\},\ i = 1, 2, \ldots N_{peaks}$$

may be detected which are represented by their estimated fractional frequency $f_i$ and where $N_{peaks}$ is the number of detected peaks. Similar to the sinusoidal coding paradigm, the peaks of the spectrum are modelled with sinusoids with a certain amplitude, frequency and phase. The fractional frequency may be expressed as a fractional number of DFT bins, such that e.g. the Nyquist frequency is found at f=N/2+1. Each peak may be associated with a number of frequency bins representing the peak. These are found by rounding the fractional frequency to the closest integer and including the neighboring bins, e.g. the $N_{near}$ peaks on each side:

$$\begin{cases} k_i = [f_i] \\ G_i = \{k_i - N_{near}, \ldots, k_i, \ldots, k_i + N_{near}\} \end{cases}$$

where [·] represents the rounding operation and $G_i$ is the group of bins representing the peak at frequency $f_i$. The number $N_{near}$ is a tuning constant that may be determined when designing the system. A larger $N_{near}$ provides higher accuracy in each peak representation, but also introduces a larger distance between peaks that may be modeled. A suitable value for $N_{near}$ may be 1 or 2. The peaks of the concealment spectrum $\hat{X}_{ECU}(m, k)$ may be formed by using these groups of bins, where a phase adjustment has been applied to each group. The phase adjustment accounts for the change in phase in the underlying sinusoid, assuming that the frequency remains the same between the last correctly received and decoded frame and the concealment frame. The phase adjustment is based on the fractional frequency and the number of samples between the analysis frame of the previous frame and where the current frame would start. As illustrated in FIG. 3, this number of samples is $N_{step21}$ between the start of the second subframe of the last received frame and the start of the first subframe of the first ECU frame, and $N_{full}$ between the first subframe of the last received frame and the first subframe of the first ECU frame. Note that $N_{full}$ also gives the distance between the second subframe of the last received frame and the second subframe of the first ECU frame.

Figure 4:
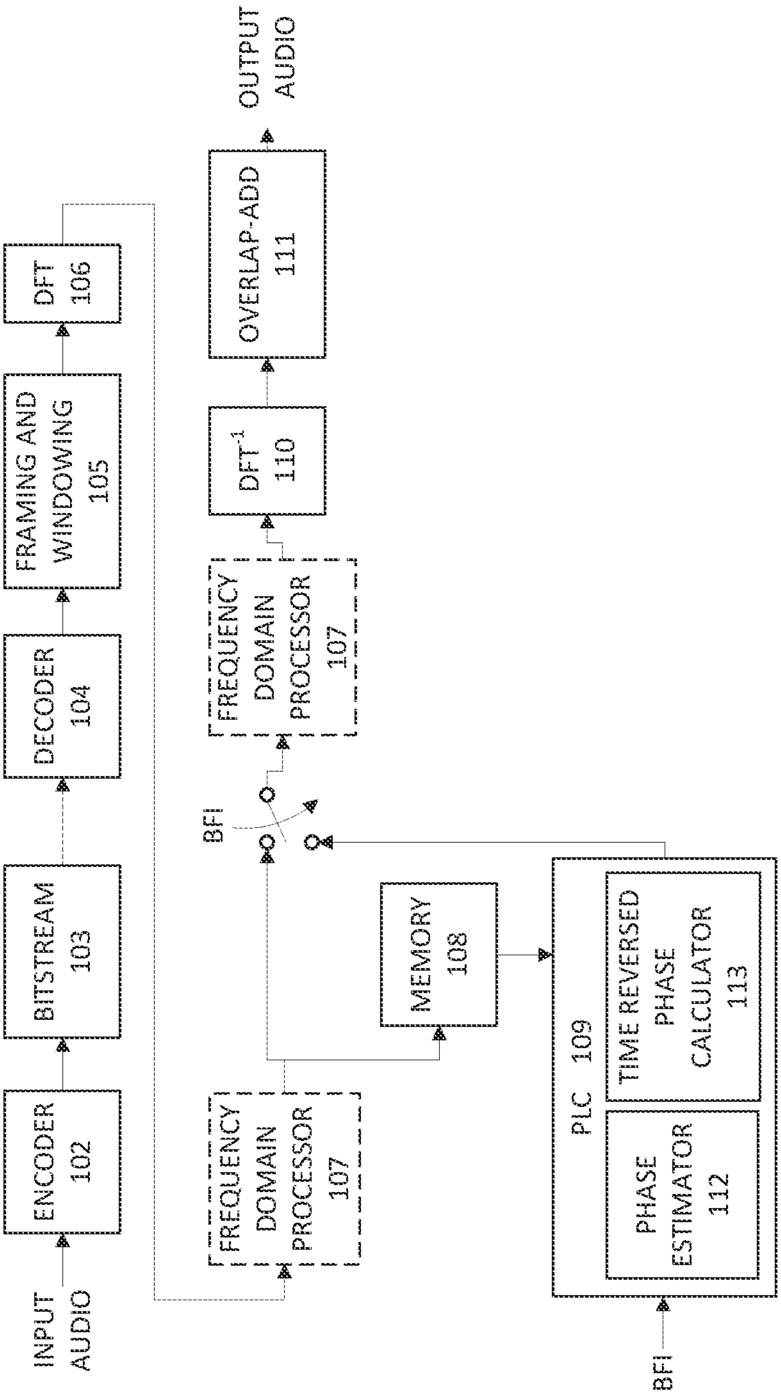
FIG. 4 is a block diagram illustrating an encoder and decoder system including a PLC method which performs a phase estimation and applies ECU synthesis in reversed time using a time reversed phase calculator according to some embodiments.

FIG. 4 illustrates an encoder and decoder system where a PLC block 109 performs a phase estimation using a phase estimator 112 and applies ECU synthesis in reversed time using a time reversed phase calculator 113 according to embodiments described below.

Figure 5:
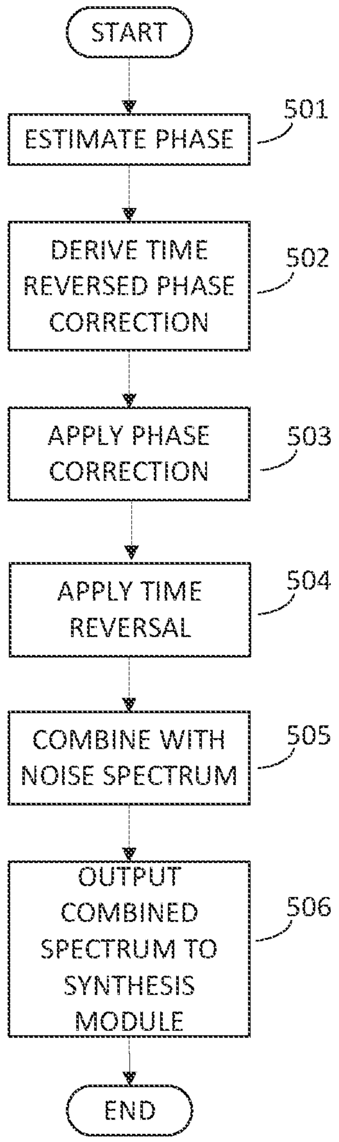
FIG. 5 is a flow chart illustrating operations of a decoder device performing time reversed ECU synthesis according to some embodiments.

FIG. 5 is a flowchart illustrating the steps of time reversed ECU synthesis described below. For the concealment of the first subframe, the ECU synthesis may be done in reversed time to obtain the desired window shape. The phase adjustment, or phase correction or phase progression (these terms are used interchangeably throughout the description), for the first subframe for peak i may be written as $$\Delta\phi_i = -2\phi_i - 2\pi f_i (N + N_{step21} + (N_{lost} - 1)N_{full})/N,$$

where $N_{lost}$ denotes the number of consecutive lost frames and $\phi_i$ denotes the phase of the sinusoid at frequency $f_i$. The term $(N_{lost}-1)\ N_{full}$ handles the phase progression for burst errors, where the step is incremented with the frame length of the full frame $N_{full}$. For the first lost frame, $N_{lost}=1$. For frequencies that are centered on the frequency bins of the spectrum $\hat{X}_{mem}(k)$ the phase $\phi_i$ is readily available just by extracting the angle:

$$\phi_i = \angle\hat{X}_{mem}(k_i)$$

$$\text{where } k_i = [f_i].$$

In general, the frequency $f_i$ is a fractional number and the phase needs to be estimated in operation 501. One estimation method is to use linear interpolation of the phase spectrum.

$$\phi_i = (f_i - \lfloor f_i \rfloor)\left(\angle\hat{X}_{mem}(\lceil f_i \rceil) - \angle\hat{X}_{mem}(\lfloor f_i \rfloor)\right) + \angle\hat{X}_{mem}(\lfloor f_i \rfloor)$$

where $\lfloor\cdot\rfloor$ and $\lceil\cdot\rceil$ represent the operators for rounding down and up respectively. However, this estimation method was found to be unstable. This estimation method further requires two phase extractions, which requires the computationally complex arctan function in case the spectrum is represented with complex numbers in the standard form a+bi. Another phase estimation that was found reliable at relatively low computational complexity is $$\phi_i = \angle\hat{X}_{mem}(k_i) - f_{frac}(\phi_C + \pi)$$

$$f_{frac} = f_i - k_i$$

where $f_{frac}$ is the rounding error and $\phi_c$ is a tuning constant which depends on the window shape that is applied. For the window shape of this embodiment, a suitable value was found to be $\phi_c$=0.33. For another window shape it was found to be $\phi_c$=0.48. In general, it is expected that a suitable value can be found in the range [0.1,0.7].

In operation 502 a time reversed phase adjustment $\Delta\phi_i$ is derived as explained above.

The peaks of the concealment spectrum may be formed by applying the phase adjustment to the stored spectrum in operation 503.

$$\hat{X}_{ECU}(m, k) = \left(\hat{X}_{mem}(k)e^{j\Delta\phi_i}\right)^*, k \in G_i$$

The asterisk '*' denotes the complex conjugate, which gives a time reversal of the signal in operation 504. This results in a time reversal of the first ECU subframe. It should be noted that it may also be possible to perform the reversal in time domain after inverse DFT. However, if $\hat{X}_{ECU}(m, k)$ only represents a part of the complete spectrum this requires that the remaining spectrum is pretreated e.g. by a time reversal before the DFT analysis.

The remaining bins of $\hat{X}_{ECU}(m, k)$, which are not occupied by the peak bins $G_i$, may be referred to as the noise spectrum or the noise component of the spectrum. They may be populated using the coefficients of the stored spectrum with a random phase applied:

$$\hat{X}_{ECU}(m, k) = \hat{X}_{mem}(k)e^{j\phi_{rand}}, k \notin G_i$$

where $\phi_{rand}$ denotes a random phase value. The remaining bins may also be populated with spectral coefficients that retain a desired property of the signal, e.g. correlation with a second channel in a multichannel decoder system. In operation 505 the peak spectrum $\hat{X}_{ECU}(m, k)$, where $k \in G_i$, is combined with the noise spectrum $\hat{X}_{ECU}(m, k)$, where $k \notin G_i$ to form a combined spectrum.

In embodiments where noise is generated in the time domain and is windowed and transformed, a time reversal of the noise to match the windowing of the peak components and the combination with the peak spectrum should be performed prior to applying the time reversal described above.

For the generation of the second subframe, which is synthesized in normal (non-reversed) time, the regular phase adjustment may be used.

$$\Delta\phi_i = 2\pi f_i N_{full} N_{lost}/N$$

The ECU synthesis for the second subframe may be formed similar to the first subframe, but omitting the complex conjugate on the peak coefficients.

$$\hat{X}_{ECU}(m, k) = \hat{X}_{mem}(k)e^{j\Delta\phi_i}, k \in G_i$$

$$\hat{X}_{ECU}(m, k) = \hat{X}_{mem}(k)e^{j\phi_{rand}}, k \notin G_i$$

Once the combined concealment spectrum is generated in operation 505, the combined concealment spectrum may be fed to the following processing steps in operation 506, including inverse DFT and an overlap-add operation which results in an output audio signal.

The output audio signal may be transmitted to one or more speakers such as loudspeakers for playback. The speakers may be part of the decoding device, be a separate device, or part of another device.

Derivation of Phase Correction Formula for Time Reversed ECU Synthesis

Assume the start phase of the sinusoid component is $\phi_0$ and that the frequency of the sinusoid is f. The desired phase $\phi_1$ of the sinusoid after advancing by $N_{step}$ samples is then $$\phi_1 = \phi_0 + 2\pi f N_{step}/N$$

For a time-reversed continuation of the sinusoid, the phase needs to be mirrored in the real axis by applying the complex conjugate or by simply taking the negative phase $-\phi_1$. Since this phase angle now represents the endpoint of the ECU synthesis frame, the phase needs to be wound back by the length of the analysis frame to get to the desired start phase $\phi_2$.

$$\phi_2 = -\phi_1 - 2\pi f(N-1)/N$$

To obtain a phase correction $\Delta\phi$, the start phase needs to be subtracted, i.e., $$\phi_0 + \Delta\phi = \phi_2 \Rightarrow \Delta\phi = \phi_2 - \phi_0$$

Substituting $\phi_2$ gives $$\Delta\phi = -2\phi_0 - 2\pi f(N_{step} + N - 1)/N$$

To add progression for consecutive frame losses (burst loss), a factor corresponding to the number of samples between the starting points of the full frames can be added, $N_{offset}=(N_{lost}-1)N_{full}$. This provides the final phase correction $$\Delta\phi = -2\phi_0 - 2\pi f(N + N_{step} - 1 + (N_{lost} - 1)N_{full})/N,$$

The desired time reversal can be achieved in DFT domain by using a complex conjugate together with a one-sample circular shift. This circular shift can be implemented with a phase correction of $2\pi k/N$ which may be included in the final phase correction.

$$\Delta\phi = -2\phi_0 - 2\pi f(N + N_{step} - 1 + (N_{lost} - 1)N_{full})/N + 2\pi k/N$$

For the coefficients representing a single peak, the frequency bin k of the circular shift can be approximated with the fractional frequency $k \approx f$, and the phase correction may be simplified to $$\Delta\phi = -2\phi_0 - 2\pi f(N + N_{step} - 1 + (N_{lost} - 1)N_{full})/N + 2\pi f/N = -2\phi_0 - 2\pi f(N + N_{step} + (N_{lost} - 1)N_{full})/N$$

The windows may be designed such that $N=N_{full}$, in which case the expression can be further simplified to $$\Delta\phi = -2\phi_0 - 2\pi f(N_{step} + N_{lost} \cdot N)/N$$

An Alternative Embodiment of the Reversed Time ECU Synthesis

In another embodiment, the phase correction is done in two steps. The phase is advanced in a first step, ignoring the mismatch of the window.

$$\Delta\phi = 2\pi f(N_{step} + (N_{lost} - 1)N_{full})$$

$$\hat{X}_{ECU,1}(m, k) = \hat{X}_{mem}(k)e^{j\Delta\phi_i}, \; k \in G_i$$

In a second step, the time reversal of the windowing may be achieved by turning the phase back by $-\phi_m$, applying the complex conjugate and restoring the phase with $\phi_m$:

$$\hat{X}_{ECU}(m, k) = \left(\hat{X}_{ECU,1}(k)e^{-j\Delta\phi_m}\right)^* e^{j\Delta\phi_m}, \; k \in G_i$$

Figure 6:
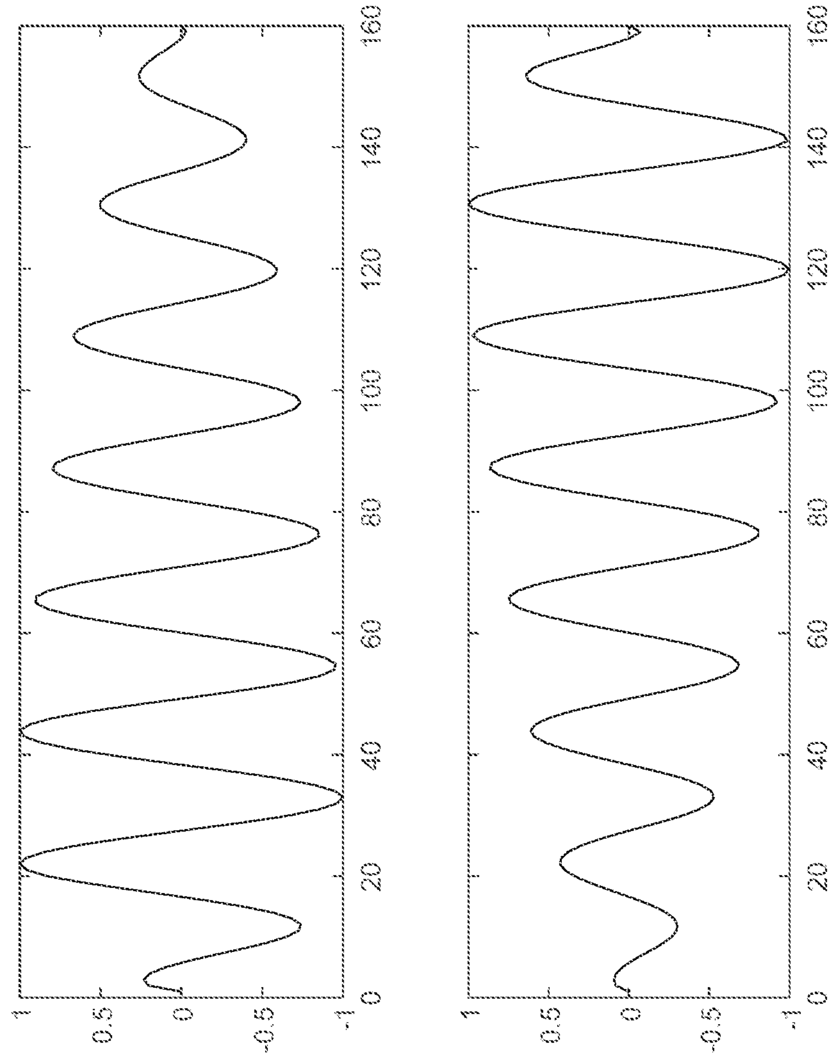
FIG. 6 is an illustration of a time reversed window on a sinusoid according to some embodiments.
Figure 7:
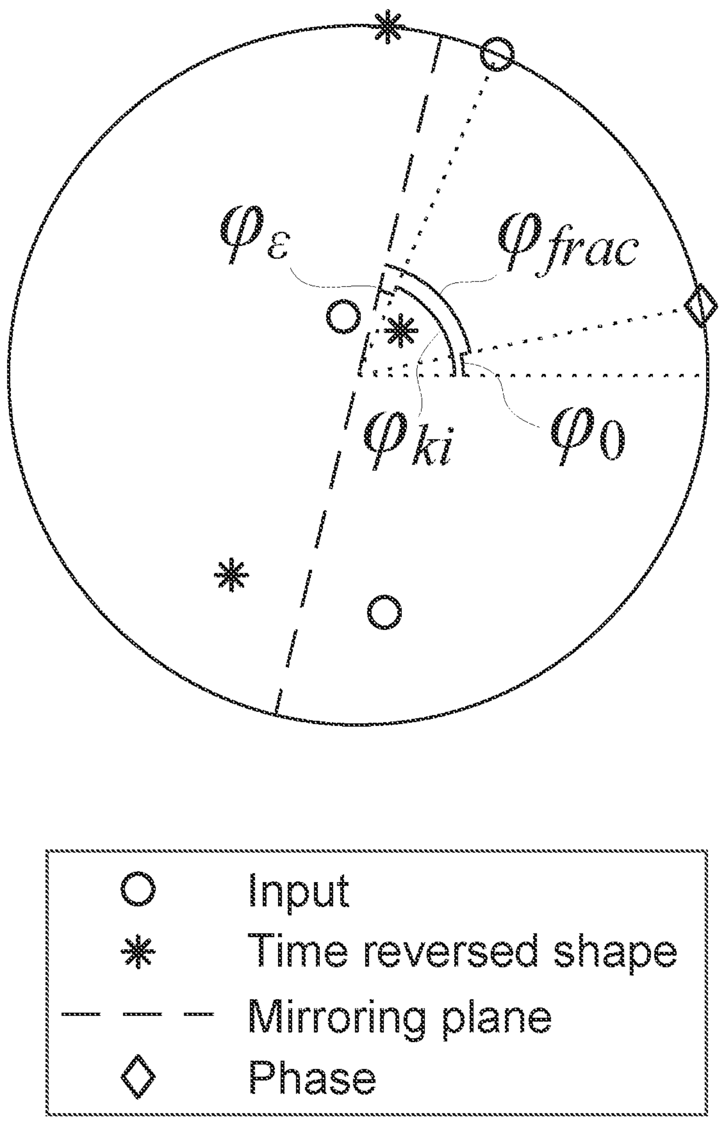
FIG. 7 is an illustration of how a reversed time window affects DFT coefficients in the complex plane according to some embodiments.

The motivation for this operation can be found by studying the effect of a time reversed window on a sinusoid as illustrated in FIG. 6. In FIG. 6, the upper plot shows the window applied in a first direction, and the lower plot shows the window applied in the reverse direction. The three coefficients representing the sinusoid is illustrated in FIG. 7, which illustrates how a reversed time window affect the DFT coefficients in the complex plane. The three DFT coefficients approximating the sinusoid in in the upper plot of FIG. 6 is marked with circles, while the corresponding coefficients of the lower plot of FIG. 6 is marked with stars. The diamond denotes the position of the original phase of the sinusoid and the dashed line shows an observed mirroring plane through which the coefficients of the time reversed window are projected. The time reversed window gives a mirroring of the coefficients in a mirroring plane with an angle $\phi_m$.

$$\phi_m = \phi_0 + \phi_{frac}$$

Figure 8:
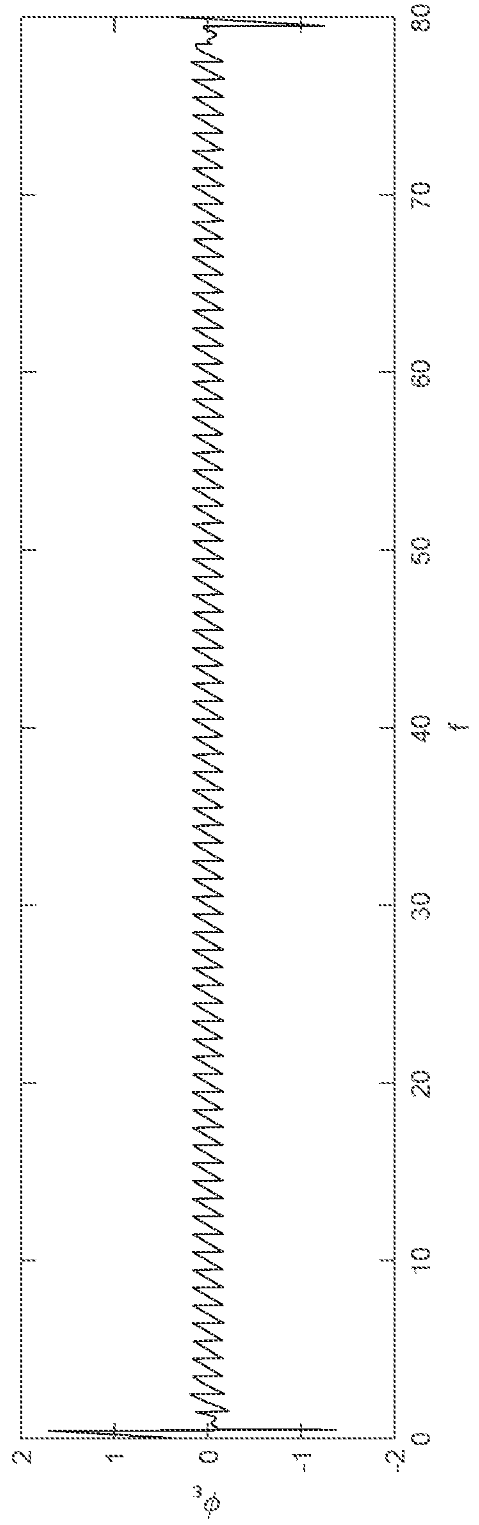
FIG. 8 is an illustration of de vs frequency f according to some embodiments.

Through experimentation, it was found that $\phi_{frac}$ could be expressed as $$\phi_{frac} = \pi f_{frac}$$

$$f_{frac} = f_i - k_i$$

$$k_i = [f_i]$$

where [·] denotes the rounding operation. It was also found that $\phi_\varepsilon$, expressed as a positive angle, can be approximated by a linear relation with $f_{frac}$. In FIG. 8, the angle $\phi_\varepsilon$ is expressed as a function of the frequency f. Studying the sawtooth shape of FIG. 8, it was found that a good approximation of $\phi_\varepsilon$ was found to be $$\phi_\varepsilon = -f_{frac}\phi_C$$

where $\phi_c$ is a constant. In one embodiment, $\phi_c$ may be set to $\phi_c$=0.33, which yields a close approximation. Since $\phi_0$ is not explicitly known, an alternative approximation of $\phi_m$ can be written as $$\hat{\phi}_m = \phi_{k_i} + \phi_\varepsilon$$

where $\phi_{k_i}$ is the phase of the maximum peak coefficient found at the rounded frequency bin $k_i$ after the first phase adjustment step, $$\phi_{k_i} = \angle\hat{X}_{ECU,1}(m, k_i)$$

The operation of aligning the mirroring plane with the real axis, applying the complex conjugate and turning the phase back again can be understood as adjusting the phase of the shaped sinusoid to a phase position which is neutral to the complex conjugate (0 or π), thereby only reversing the temporal shape of the signal. The two-step approach is more computationally complex than the formerly described embodiment. However, the observations can also lead to an approximation of $\phi_0$. It can be seen from FIG. 7 that $\phi_0$ may be expressed as $$\phi_0 = \phi_{k_i} + \phi_\varepsilon - \phi_{frac} = \phi_{k_i} - f_{frac}(\phi_C + \pi)$$

which is the phase approximation used above.

Operations of the decoder device 900 (implemented using the structure of the block diagram of FIG. 9) will now be discussed with reference to the flow chart of FIG. 10 according to some embodiments. For example, modules may be stored in memory 904 of FIG. 9, and these modules may provide instructions so that when the instructions of a module are executed by respective decoder device processing circuitry 902, processing circuitry 902 performs respective operations of the flow chart.

In operation 1000, processing circuitry 902 generates frequency spectra on a subframe basis where consecutive subframes of the audio signal have a property that an applied window shape of first subframe of the consecutive subframes is a mirrored version or a time reversed version of a second subframe of the consecutive subframes. For example, generating the frequency spectra of for each subframe of the first two consecutive subframes comprises determining:

$$\hat{X}_1(m, k) = \sum_{n=0}^{N-1} \hat{x}(m, n)w_1(n)e^{-\frac{j2\pi kn}{N}}$$

$$\hat{X}_2(m, k) = \sum_{n=0}^{N-1} \hat{x}(m, n + N_{step12})w_2(n)e^{-\frac{j2\pi kn}{N}}$$

where N denotes a length of a subframe window, subframe windowing function $w_1(n)$ is a subframe windowing function for the first subframe $\hat{X}_1(m, k)$ of the consecutive subframes and $w_2(n)$ is a subframe windowing function for the second subframe $\hat{X}_2(m, k)$ of the consecutive subframes, and $N_{step12}$ is a number of samples between a first subframe of the first two consecutive subframes and the second subframe of the first two consecutive subframes.

In operation 1002, the processing circuitry 902 determines if a bad frame indicator (BFI) has been received. The bad frame indicator provides an indication that an audio frame has been lost or has been corrupted.

In operation 1004, the processing circuitry 902 stores, for each correctly decoded audio frame, the spectrum corresponding to the second subframe in memory. For example, for a correctly decoded frame m, the spectrum corresponding to the second subframe $\hat{X}_2(m, k)$ is stored in memory such as $\hat{X}_{mem}(k) := \hat{X}_2(m, k)$. For correctly received frames, the decoder device 900 may proceed with preforming the frequency domain processing steps, performing the inverse DFT transform and reconstructing the output audio using an overlap-add strategy as described above and illustrated in FIG. 4. Note that the principle of overlap-add is the same for both subframes and frames. The creation of a frame requires applying overlap-add on the subframes, while the final output frame is the result of an overlap-add operation between frames.

When the processing circuitry 902 detects a bad frame through a bad frame indicator (BFI) in operation 1002, the PLC operations 1006 to 1030 are performed.

In operation 1006, the processing circuitry 902 obtains the signal spectrum corresponding to the second subframe of a first two consecutive subframes previously correctly decoded and processed. For example, the processing circuitry 902 may obtain the signal spectrum from the memory 904 of the decoding device.

In operation 1008, the processing circuitry 902 detects peaks of the signal spectrum of a previously received audio frame of the audio signal on a fractional frequency scale, the previously received audio frame received prior to receiving the bad frame indicator.

In operation 1010, the processing circuitry 902 determines whether the concealment frame is for the first subframe of two consecutive subframes.

If the concealment frame is for the first subframe, in operation 1012, the processing circuitry 902 estimates the phase of each of the peaks. In one embodiment, calculating a phase estimation for the peaks of the time reversed phase corrected peaks in accordance with:

$$\phi_i = \angle\hat{X}_{mem}(k_i) + f_{frac}(\phi_C - \pi)$$

$$f_{frac} = f_i - k_i$$

where $\phi_i$ is an estimated phase at frequency $f_i$, $\angle\hat{X}_{mem}(k_i)$ is an angle of spectrum $\hat{X}_{mem}$ at a frequency bin $k_i$, $f_{frac}$ is a rounding error, $\phi_c$ is a tuning constant, and $k_i$ is $[f_i]$. The tuning constant $\phi_c$ may be a value in a range between 0.1 and 0.7.

In operation 1014, the processing circuitry 902 derives a time reversed phase correction to apply to the peaks of the signal spectrum based on the estimated phase.

In operation 1016, the processing circuitry 902 applies the time reversed phase correction to the peaks of the signal spectrum to form time reversed phase corrected peaks.

In operation 1018, the processing circuitry 902 applies a time reversal to the concealment audio subframe. In one embodiment, the time reversal may be applied by applying a complex conjugate to the concealment audio subframe.

In operation 1020, the processing circuitry 902 combines the time reversed phase corrected peaks with a noise spectrum of the signal spectrum to form a combined spectrum of the concealment audio subframe.

Figure 11:
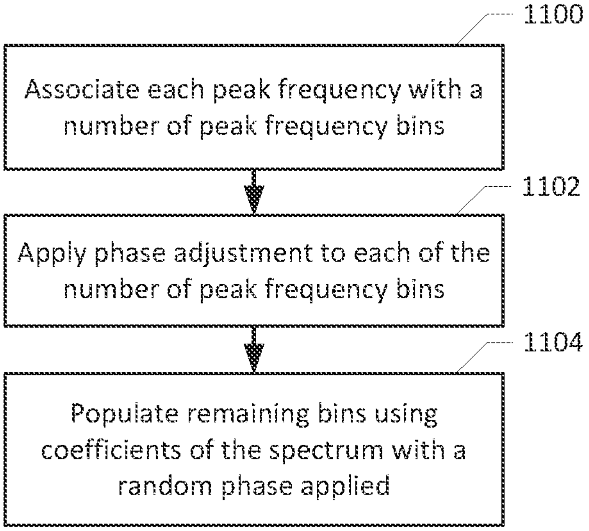
FIG. 11 is a flow chart illustrating operations of a decoder device according to some embodiments.

Turning to FIG. 11, in one embodiment, 1016 and 1018 may be performed by the processing circuitry 902 associating each peak with a number of peak frequency bins in operation 1100. The processing circuitry 902 associating may apply the time reversed phase correction by applying the time reversed phase correction to each of the number of frequency bins in operation 1102. In operation 1104, remaining bins are populated using coefficients of the signal spectrum with a random phase applied.

Returning to FIG. 10, in operation 1022, the processing circuitry 902 generates a synthesized concealment audio subframe based on the combined spectrum If the concealment frame is not for the first subframe as determined in operation 1010, the processing circuitry 902 derives in operation 1024 a non-time reversed phase correction to apply to the peaks of the signal spectrum for a second concealment subframe of the at least two consecutive concealment subframes.

In operation 1026, the processing circuitry 902 applies the non-time reversed phase correction to the peaks of the signal spectrum for the second subframe to form non-time reversed phase corrected peaks.

In operation 1028, the processing circuitry 902 combines the non-time reversed phase corrected peaks with a noise spectrum of the signal spectrum to form a combined spectrum for the second concealment subframe.

In operation 1030, the processing circuitry 902 generates a second synthesized concealment audio subframe based on the combined spectrum.

Turning to FIG. 11, in one embodiment, 1026 and 1028 may be performed by the processing circuitry 902 associating each peak with a number of peak frequency bins in operation 1100. The processing circuitry 902 associating may apply the non-time reversed phase correction by applying the non-time reversed phase correction to each of the number of frequency bins in operation 1102. In operation 1104, remaining bins are populated using coefficients of the signal spectrum with a random phase applied.

Figure 10:
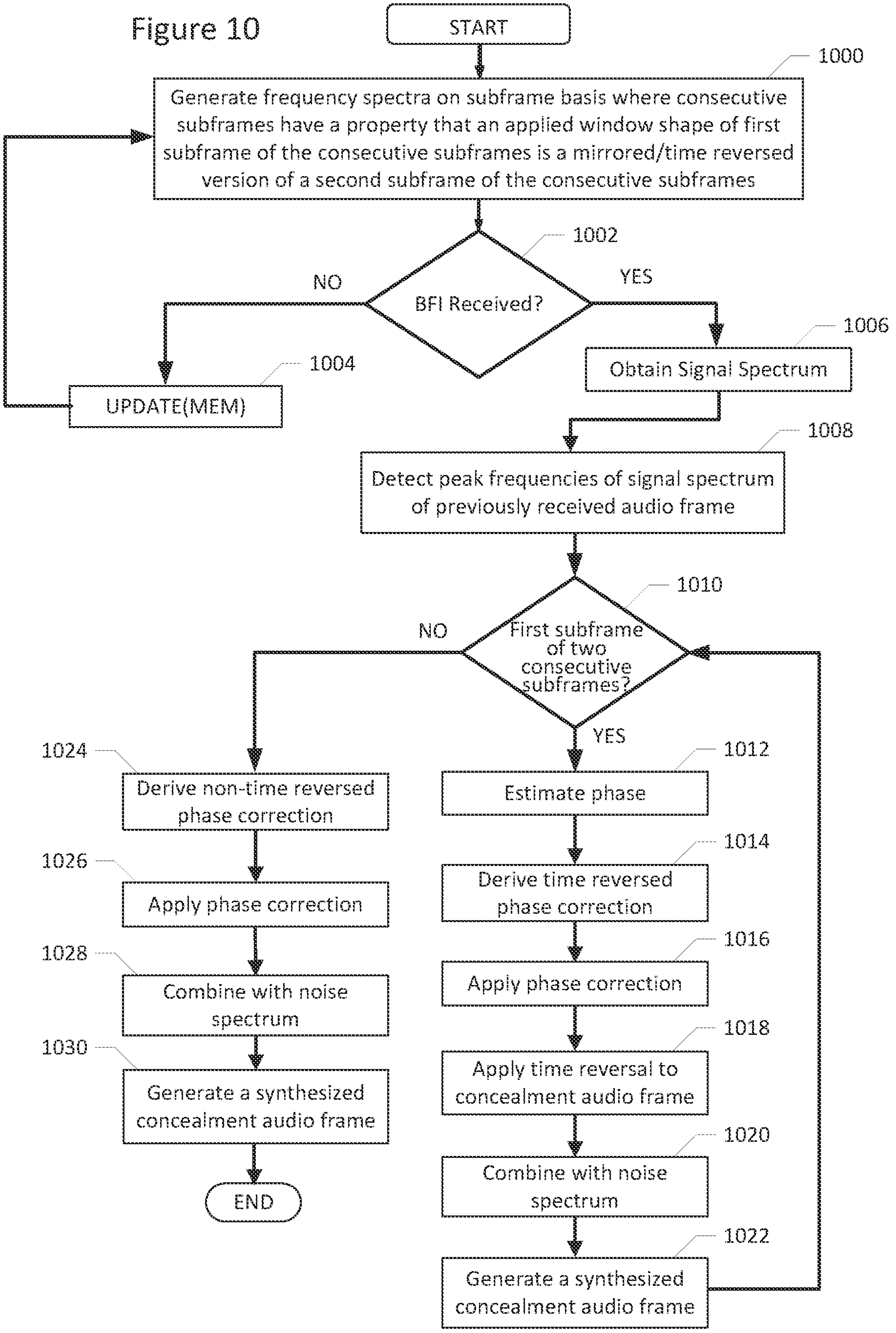
FIG. 10 is a flow chart illustrating operations of a decoder device according to some embodiments.

Various operations from the flow chart of FIG. 10 may be optional with respect to some embodiments of decoder devices and related methods. Regarding methods of example embodiment 1 (set forth below), for example, operations of blocks 1004 and 1022-1030 of FIG. 10 may be optional. Regarding methods of example embodiment 19 (set forth below), for example, operations of blocks 1010 and 1022-1030 of FIG. 10 may be optional.

Example embodiments are discussed below.

1. A method of generating a concealment audio subframe of an audio signal in a decoding device, the method comprising:

generating (1000) frequency spectra on a subframe basis where consecutive subframes of the audio signal have a property that an applied window shape of first subframe of the consecutive subframes is a mirrored version or a time reversed version of a second subframe of the consecutive subframes;

receiving (1002) a bad frame indicator;

detecting (1008) peaks of a signal spectrum of a previously received audio frame of the audio signal on a fractional frequency scale, the previously received audio frame received prior to receiving the bad frame indicator;

estimating (1012) a phase of each of the peaks;

deriving (1014) a time reversed phase correction to apply to the peaks of the signal spectrum based on the phase estimated;

applying (1016) the time reversed phase correction to the peaks of the signal spectrum to form time reversed phase corrected peaks;

applying (1018) a time reversal to the concealment audio subframe;

combining (1020) the time reversed phase corrected peaks with a noise spectrum of the signal spectrum to form a combined spectrum for the concealment audio subframe; and generating (1022) a synthesized concealment audio subframe based on the combined spectrum.

2. The method of Embodiment 1 wherein a synthesized concealment audio frame comprises at least two consecutive concealment subframes and wherein deriving the time reversed phase correction, applying the time reversed phase correction, applying the time reversal and combining the time reversed phase corrected peaks are performed for a first concealment subframe of the at least two consecutive concealment subframes, the method further comprising:

deriving (1024) a non-time reversed phase correction to apply to the peaks of the signal spectrum for a second concealment subframe of the at least two consecutive concealment subframes;

applying (1026) the non-time reversed phase correction to the peaks of the signal spectrum for the second subframe to form non-time reversed phase corrected peaks;

combining (1028) the non-time reversed phase corrected peaks with a noise spectrum of the signal spectrum to form a combined spectrum for the second concealment subframe; and generating (1030) a second synthesized concealment audio subframe based on the combined spectrum.

3. The method of any of Embodiments 1-2 wherein the concealment audio subframe comprises a concealment audio subframe for one of a lost audio frame and a corrupted audio frame.

4. The method of any of Embodiments 1-3 wherein the bad frame indicator provides an indication that an audio frame is lost or corrupted.

5. The method of any of Embodiments 1-4 further comprising obtaining the signal spectrum of the previously received audio signal frame from a memory of the decoder.

6. The method of any of Embodiments 1-5 wherein applying the time reversal comprises applying a complex conjugate to the concealment audio subframe.

7. The method of any of Embodiments 1-6 further comprising:

associating (1100) each peak of the number of peaks with a number of peak frequency bins representing the peak.

8. The method of Embodiment 7 wherein for each peak of the number of peaks, one of the time reversed phase correction and the non-time reversed phase correction is applied (1102) to the peak.

9. The method of any of Embodiment 8 further comprising:

populating (1104) remaining bins of the signal spectrum using coefficients of the stored signal spectrum with a random phase applied.

10. The method of any of Embodiments 1-9 wherein estimating the phase of each of the peaks comprises:

calculating a phase estimation for the peaks of the time reversed phase corrected peaks in accordance with:

$$\phi_i = \angle\hat{X}_{mem}(k_i) - f_{frac}(\phi_C + \pi)$$

$$f_{frac} = f_i - k_i$$

where $\phi_i$ is an estimated phase at frequency $f_i$, $\angle\hat{X}_{mem}(k_i)$ is an angle of spectrum $\hat{X}_{mem}$ at a frequency bin $k_i$, $f_{frac}$ is a rounding error, $\phi_c$ is a tuning constant, and $k_i$ is $[f_i]$.

11. The method of Embodiment 10 wherein $\phi_c$ has a value in a range between 0.1 and 0.7.

12. The method of Embodiment 10 wherein calculating the phase estimation for the non-time reversed phase corrected peaks is calculated in accordance with:

$$\Delta\phi_i = 2\pi f_i N_{full} N_{lost} / N$$

where $\Delta\phi_i$ denotes a phase correction of a sinusoid at the frequency $f_i$, $N_{full}$ denotes a number of samples between two frames, $N_{lost}$ denotes a number of consecutive lost frames, and N denotes a length of a subframe window.

13. The method of any of Embodiments 1-12 further comprising applying a random phase to the noise spectrum of the signal spectrum.

14. The method of Embodiment 13 wherein applying the random phase to the noise spectrum comprises applying the random phase to the noise spectrum prior to combining the non-time reversed phase corrected peaks with the noise spectrum.

15. A decoder device (900) configured to generate a concealment audio subframe of a received audio signal, wherein a decoding method of the decoding device generates frequency spectra on a subframe basis where consecutive subframes have a property that an applied window shape is a mirrored version or a time reversed version of each other, the decoder device comprising:

processing circuitry (902); and memory (904) coupled with the processing circuitry, wherein the memory includes instructions that when executed by the processing circuitry causes the decoder device to perform operations according to any of Embodiments 1-14.

16. A decoder device (900) configured to generate a concealment audio subframe of a received audio signal, wherein a decoding method of the decoding device generates frequency spectra on a subframe basis where consecutive subframes have a property that an applied window shape is a mirrored version or a time reversed version of each other, wherein the decoder device is adapted to perform according to any of Embodiments 1-14.

17. A computer program comprising program code to be executed by processing circuitry (902) of a decoder device (900) configured to operate in a communication network, whereby execution of the program code causes the decoder device (900) to perform operations according to any of Embodiments 1-14.

18. A computer program product comprising a non-transitory storage medium including program code to be executed by processing circuitry (902) of a decoder device (900) configured to operate in a communication network, whereby execution of the program code causes the decoder device (900) to perform operations according to any of Embodiments 1-14.

19. A method of generating a concealment audio subframe for an audio signal in a decoding device, the method comprising:
generating (1000) frequency spectra on a subframe basis where consecutive subframes of the audio signal have a property that an applied window shape of first subframe of the consecutive subframes is a mirrored version or a time reversed version of a second subframe of the consecutive subframes;
storing (1004) a signal spectrum corresponding to a second subframe of a first two consecutive subframes;
receiving a bad frame indicator (1002) for a second two consecutive subframes;
obtaining (1006) the signal spectrum;
detecting (1008) peaks of the signal spectrum on a fractional frequency scale;
estimating (1012) a phase of each of the peaks;
deriving (1014) a time reversed phase correction to apply to the peaks of the spectrum stored for a first subframe of the second two consecutive subframes based on the phase estimated;
applying (1016) the time reversed phase correction to the peaks of the signal spectrum to form time reversed phase corrected peaks;
applying (1018) a time reversal to the concealment audio subframe;
combining (1020) the time reversed phase corrected peaks with a noise spectrum of the signal spectrum to form a combined spectrum for the first subframe of the second two consecutive subframes; and
generating (1022) a synthesized concealment audio subframe based on the combined spectrum.

20. The method of Embodiment 19, wherein the synthesized concealment audio frame comprises at least two consecutive concealment subframes and wherein deriving the time reversed phase correction, applying the time reversed phase correction, and combining the time reversed phase corrected peaks are performed for a first concealment subframe of the at least two consecutive concealment subframes, the method further comprising:
deriving (1024) a non-time reversed phase correction to apply to peaks of the signal spectrum for a second subframe of the second two consecutive subframes;
applying (1026) the non-time reversed phase correction to the peaks of the signal spectrum for the second subframe of the second two consecutive subframes to form non-time reversed phase corrected peaks;
combining (1028) the non-time reversed audio subframe with a noise spectrum of the signal spectrum to form a second combined spectrum for the second subframe of the second two consecutive subframes; and
generating (1030) a second synthesized audio subframe based on the second combined spectrum.

21. The method of any of Embodiments 19-20 wherein the concealment audio subframe comprises a concealment audio subframe for one of a lost audio frame and a corrupted audio frame.

22. The method of any of Embodiments 19-21 wherein the bad frame indicator provides an indication that an audio frame is lost or corrupted.

23. The method of any of Embodiments 19-22 further comprising obtaining the signal spectrum from a memory of the decoder.

24. The method of any of Embodiments 19-23 wherein applying the time reversal comprises applying a complex conjugate to the concealment audio subframe.

25. The method of any of Embodiments 18-24 further comprising:
associating each peak with a number of peak frequency bins representing the peak.

26. The method of Embodiment 25 further comprising, for each peak of the number of peaks, applying one of the time reversed phase correction and the non-time reversed phase correction to the peak.

27. The method of any of Embodiment 26 further comprising:
populating remaining bins of the signal spectrum using coefficients of the spectrum stored with a random phase applied.

28. The method of any of Embodiments 19-27 wherein estimating the phase comprises:
calculating a phase estimation for the time reversed phase corrected peaks in accordance with:

$$\phi_i = \angle\hat{X}_{mem}(k_i) - f_{frac}(\phi_C + \pi)$$

$$f_{frac} = f_i - k_i$$

where $\phi_i$ is an estimated phase at frequency $f_i$, $\angle\hat{X}_{mem}(k_i)$ is an angle of spectrum $\hat{X}_{mem}$ at frequency $f_i$, $f_{frac}$ is a rounding error, $\phi_c$ is a tuning constant, and $k_i$ is $[f_i]$.

29. The method of Embodiment 28 wherein $\phi_c$ has a value in a range between 0.1 and 0.7.

30. The method of Embodiment 28 further comprising calculating a phase estimation for the non-time reversed phase corrected peaks in accordance with:

$$\Delta\phi_i = 2\pi f_i N_{full} N_{lost} / N$$

where $\Delta\phi_i$ denotes a phase correction of a sinusoid at frequency $f_i$, $N_{full}$ denotes a number of frame samples between two frames, $N_{lost}$ denotes a number of consecutive lost frames, and N denotes a length of a subframe window.

31. The method of any of Embodiments 19-30 wherein generating the frequency spectra of for each subframe of the first two consecutive subframes comprises determining:

$$\hat{X}_1(m, k) = \sum_{n=0}^{N-1} \hat{x}(m, n) w_1(n) e^{-\frac{j2\pi kn}{N}}$$

$$\hat{X}_2(m, k) = \sum_{n=0}^{N-1} \hat{x}(m, n + N_{step12}) w_2(n) e^{-\frac{j2\pi kn}{N}}$$

where N denotes a length of a subframe window, subframe windowing function $w_1(n)$ is a subframe windowing function for the first subframe $\hat{X}_1(m, k)$ of the consecutive subframes and $w_2(n)$ is a subframe windowing function for the second subframe $\hat{X}_2(m, k)$ of the consecutive subframes, and $N_{step12}$ is a number of samples between a first subframe of the first two consecutive subframes and the second subframe of the first two consecutive subframes.

32. The method of any of Embodiments 19-31 further comprising applying a random phase to the noise spectrum of the signal spectrum.

33. The method of Embodiment 32 wherein applying the random phase to the noise spectrum comprises applying the random phase to the noise spectrum prior to combining the non-time reversed phase corrected peaks with the noise spectrum.
34. A decoder device (900) configured to generate a concealment audio subframe of a received audio signal, wherein a decoding method of the decoding device generates frequency spectra on a subframe basis where consecutive subframes have a property that an applied window shape is mirrored version or a time reversed version of each other, the decoder device comprising:
processing circuitry (902); and
memory (904) coupled with the processing circuitry, wherein the memory includes instructions that when executed by the processing circuitry causes the decoder device to perform operations according to any of Embodiments 19-33.
35. A decoder device (900) configured to generate a concealment audio subframe of a received audio signal, wherein a decoding method of the decoding device (900) generates frequency spectra on a subframe basis where consecutive subframes have a property that an applied window shape is a mirrored version or a time reversed version of each other, wherein the decoder device is adapted to perform according to any of Embodiments 19-33.
36. A computer program comprising program code to be executed by processing circuitry (902) of a decoder device (900) configured to operate in a communication network, whereby execution of the program code causes the decoder device (900) to perform operations according to any of Embodiments 19-33.
37. A computer program product comprising a non-transitory storage medium including program code to be executed by processing circuitry (902) of a decoder device (900) configured to operate in a communication network, whereby execution of the program code causes the decoder device (900) to perform operations according to any of Embodiments 19-33.

Explanations are provided below for various abbreviations/acronyms used in the present disclosure.

| Abbreviation | Explanation |
|---|---|
| DFT | Discrete Fourier Transform |
| IDFT | Inverse Discrete Fourier Transform |
| LP | Linear Prediction |
| PLC | Packet Loss Concealment |
| ECU | Error Concealment Unit |
| FEC | Frame Error Correction/Concealment |

References are identified below.

[1] T. Vaillancourt, M. Jelinek, R. Salami and R. Lefebvre, "Efficient Frame Erasure Concealment in Predictive Speech Codecs using Glottal Pulse Resynchronisation," 2007 IEEE International Conference on Acoustics, Speech and Signal Processing—ICASSP '07, Honolulu, HI, 2007, pp. IV-1113-IV-1116.
[2] J. Lecomte et al., "Packet-loss concealment technology advances in EVS," 2015 IEEE International Conference on Acoustics, Speech and Signal Processing (ICASSP), Brisbane, QLD, 2015, pp. 5708-5712.
[3] 3GPP TS 26.447, Codec for Enhanced Voice Services (EVS); Error Concealment of Lost Packets (Release 12)
[4] S. Bruhn, E. Norvell, J. Svedberg and S. Sverrisson, "A novel sinusoidal approach to audio signal frame loss concealment and its application in the new evs codec standard," 2015 IEEE International Conference on Acoustics, Speech and Signal Processing (ICASSP), Brisbane, QLD, 2015, pp. 5142-5146.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In the above-description of various embodiments, it is to be understood that the terminology used herein is for the purpose of describing particular embodiments only and is not intended to be limiting. Unless otherwise defined, all terms (including technical and scientific terms) used herein have the same meaning as commonly understood by one of ordinary skill in the art to which present disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present disclosure. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present disclosure may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of embodiments. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present disclosure. All such variations and modifications are intended to be included herein within the scope of present disclosure. Accordingly, the above disclosed subject matter is to be considered illustrative, and not restrictive, and the examples of embodiments are intended to cover all such modifications, enhancements, and other embodiments, which fall within the spirit and scope of present disclosure. Thus, to the maximum extent allowed by law, the scope of present disclosure is to be determined by the broadest permissible interpretation of the present disclosure including the examples of embodiments and their equivalents, and shall not be restricted or limited by the foregoing detailed description.

The invention claimed is:

1. A method of generating a concealment audio subframe of an audio signal in a decoding device, the method comprising:

generating frequency spectra on a subframe basis where a first subframe window of consecutive subframes is a mirrored version or a time reversed version of a second subframe window of the consecutive subframes;

detecting peaks of a signal spectrum of a previously received audio signal on a fractional frequency scale;

estimating a phase of each of the peaks;

deriving a phase adjustment for a time reversed concealment audio subframe based on the estimated phase;

applying the phase adjustment to the peaks of the signal spectrum to form phase adjusted peaks and to form a concealment audio subframe based on the phase adjusted peaks, wherein applying the phase adjustment includes applying a time reversal to the concealment audio subframe; and generating a synthesized concealment audio subframe based on the concealment audio subframe.

2. The method of claim 1 further comprising:

combining the phase adjusted peaks with a noise spectrum of the signal spectrum to form a combined spectrum for the concealment audio subframe; and wherein the synthesized concealment audio subframe is further generated based on the combined spectrum.

3. The method of claim 1, wherein the synthesized concealment audio frame comprises at least two consecutive concealment subframes and wherein deriving the phase adjustment, applying the phase adjustment, applying the time reversal and combining the phase adjusted peaks are performed for a first concealment subframe of the at least two consecutive concealment subframes, the method further comprising:

deriving a phase adjustment to apply to the peaks of the signal spectrum for a second non-time reversed concealment subframe of the at least two consecutive concealment subframes;

applying the phase adjustment to the peaks of the signal spectrum for the second non-time reversed subframe to form non-time reversed phase adjusted peaks;

combining the non-time reversed phase adjusted peaks with a noise spectrum of the signal spectrum to form a combined spectrum for the second concealment subframe; and generating a second synthesized concealment audio subframe based on the combined spectrum.

4. The method of claim 1 further comprising obtaining the signal spectrum of the previously received audio signal from a memory of the decoding device.

5. The method of claim 1, wherein applying the time reversal comprises applying a complex conjugate to the phase adjusted peaks.

6. The method of claim 1 further comprising associating each peak of the detected peaks with a number of peak frequency bins representing the peak.

7. The method of claim 6, wherein for each peak frequency bin of the number of peak frequency bins, one of the time reversed phase adjustment and the non-time reversed phase adjustment is applied to the peak frequency bin.

8. The method of claim 7 further comprising:

populating remaining bins of the signal spectrum using coefficients of the stored signal spectrum, the spectral coefficients retaining a desired property of the signal.

9. The method of claim 8, wherein the desired property comprises correlation with a second channel in a multichannel decoder system.

10. The method of claim 1, wherein estimating the phase of each of the peaks comprises:

calculating a phase estimation for the peaks of the time reversed phase adjusted peaks in accordance with:

$$\phi_i = \angle \hat{X}_{mem}(k_i) - f_{frac}(\phi_C + \pi)$$

$$f_{frac} = f_i - k_i$$

where $\phi_i$ is an estimated phase at frequency $f_i$, $\angle\hat{X}_{mem}(k_i)$ is an angle of spectrum $\hat{X}_{mem}$ of a previously received audio signal at a frequency bin $k_i$, $f_{frac}$ is a rounding error, and $\phi_c$ is a tuning constant.

11. The method of claim 10, wherein a phase adjustment for the peaks of the time reversed concealment audio subframe is calculated in accordance with:

$$\Delta\phi = -2\phi_0 - 2\pi f(N_{step21} + N_{lost}\cdot N)/N,$$

wherein $\phi$ is a phase of a peak and f is a frequency of a peak, $N_{lost}$ denotes a number of consecutive lost frames, N denotes a length of a subframe, and $N_{step}'$ is a distanced in samples between a starting point of an analysis subframe and concealment subframe.

12. A decoder device configured to generate a concealment audio subframe of an audio signal, the decoder device comprising:

processing circuitry; and memory operatively coupled with the processing circuitry, wherein the memory includes instructions that when executed by the processing circuitry causes the decoder device to perform operations comprising:

generating frequency spectra on a subframe basis a first subframe window of consecutive subframes is a mirrored version or a time reversed version of a second subframe window of the consecutive subframes;

detecting peaks of a signal spectrum of a previously received audio signal on a fractional frequency scale;

estimating a phase of each of the peaks;

deriving a phase adjustment for a time reversed concealment audio subframe based on the estimated phase;

applying the phase adjustment to the peaks of the signal spectrum to form phase adjusted peaks and to form a concealment audio subframe based on the phase adjusted peaks, wherein applying the phase adjustment includes applying a time reversal to the concealment audio subframe; and generating a synthesized concealment audio subframe based on the concealment audio subframe.

13. The decoder device of claim 12 further adapted to:

combine the phase adjusted peaks with a noise spectrum of the signal spectrum to form a combined spectrum for the concealment audio subframe; and wherein the synthesized concealment audio subframe is further generated based on the combined spectrum.

14. The decoder device of claim 12, wherein the synthesized concealment audio frame comprises at least two consecutive concealment subframes and wherein deriving the phase adjustment, applying the phase adjustment, applying the time reversal and combining the phase adjusted peaks are performed for a first concealment subframe of the at least two consecutive concealment subframes, the decoder device further adapted to:

derive a phase adjustment to apply to the peaks of the signal spectrum for a second non-time reversed concealment subframe of the at least two consecutive concealment subframes;

apply the phase adjustment to the peaks of the signal spectrum for the second non-time reversed subframe to form non-time reversed phase adjusted peaks;

combine the non-time reversed phase adjusted peaks with a noise spectrum of the signal spectrum to form a combined spectrum for the second concealment subframe; and generate a second synthesized concealment audio subframe based on the combined spectrum.

15. The decoder device of claim 12 further adapted to obtain the signal spectrum of the previously received audio signal from a memory of the decoder device.

16. The decoder device of claim 12 adapted to apply the time reversal by applying a complex conjugate to the phase adjusted peaks.

17. The decoder device of claim 12 further adapted to associate each peak of the detected peaks with a number of peak frequency bins representing the peak.

18. The decoder device of claim 17 further adapted to apply one of the phase adjustment for a time reversed concealment subframe and the phase adjustment for a non-time reversed concealment subframe to each peak frequency bin of the number of peak frequency bins.

19. The decoder device of claim 18 further adapted to:

populate remaining bins of the signal spectrum using coefficients of the stored signal spectrum, the spectral coefficients retaining a desired property of the signal.

20. The decoder device of claim 19, wherein the desired property comprises correlation with a second channel in a multichannel decoder system.

21. The decoder device of claim 12 adapted to estimate the phase of each of the peaks by calculating a phase estimation for the peaks of the time reversed phase adjusted peaks in accordance with:

$$\phi_i = \angle \hat{X}_{mem}(k_i) - f_{frac}(\phi_C + \pi)$$

$$f_{frac} = f_i - k_i$$

where $\phi_i$ is an estimated phase at frequency $f_i$, $\angle\hat{X}_{mem}(k_i)$ is an angle of spectrum $\hat{X}_{mem}$ of a previously received audio signal at a frequency bin $k_i$, $f_{frac}$ is a rounding error, and $\phi_c$ is a tuning constant.

22. The decoder device of claim 21 adapted to calculate a phase adjustment for the peaks of the time reversed concealment audio subframe in accordance with:

$$\Delta\phi = -2\phi_0 - 2\pi f(N_{step21} + N_{lost} \cdot N)/N,$$

wherein ϕ is a phase of a peak and f is a frequency of a peak, $N_{lost}$ denotes a number of consecutive lost frames, N denotes a length of a subframe, and $N_{step}'$ is a distanced in samples between a starting point of an analysis subframe and concealment subframe.

23. A computer program product comprising a non-transitory storage medium including program code to be executed by processing circuitry of a decoder device configured to operate in a communication network, whereby execution of the program code causes the decoder device to perform operations comprising:

generating frequency spectra on a subframe basis where a first subframe window of consecutive subframes is a mirrored version or a time reversed version of a second subframe window of the consecutive subframes;

detecting peaks of a signal spectrum of a previously received audio signal on a fractional frequency scale;

estimating a phase of each of the peaks;

deriving a phase adjustment for a time reversed concealment audio subframe based on the estimated phase;

applying the phase adjustment to the peaks of the signal spectrum to form phase adjusted peaks and to form a concealment audio subframe based on the phase adjusted peaks, wherein applying the phase adjustment includes applying a time reversal to the concealment audio subframe; and generating a synthesized concealment audio subframe based on the concealment audio subframe.

24. A method of generating a concealment audio subframe for an audio signal in a decoding device, the method comprising:

generating frequency spectra on a subframe basis where a first subframe window of consecutive subframes is a mirrored version or a time reversed version of a second subframe window of the consecutive subframes;

storing a signal spectrum corresponding to a second subframe window of a first two consecutive subframes;

receiving a bad frame indicator for a second two consecutive subframes;

obtaining the signal spectrum;

detecting peaks of the signal spectrum on a fractional frequency scale;

estimating a phase of each of the peaks;

deriving a phase adjustment for a time reversed concealment audio subframe based on the phase estimated;

applying the phase adjustment to the peaks of the signal spectrum to form phase adjusted peaks and to form a concealment audio subframe based on the phase adjusted peaks, wherein applying the phase adjustment includes applying a time reversal to the concealment audio subframe;

combining the phase adjusted peaks with a noise spectrum of the signal spectrum to form a combined spectrum for the first subframe window of the second two consecutive subframes; and generating a synthesized concealment audio subframe based on the combined spectrum.

25. A decoder device configured to generate a concealment audio subframe of an audio signal, the decoder device comprising:

processing circuitry; and memory operatively coupled with the processing circuitry, wherein the memory includes instructions that when executed by the processing circuitry causes the decoder device to perform operations comprising:

generating frequency spectra on a subframe basis where a first subframe window of the consecutive subframes is a mirrored version or a time reversed version of a second subframe window of the consecutive subframes;

storing a signal spectrum corresponding to a second subframe window of a first two consecutive subframes;

receiving a bad frame indicator for a second two consecutive subframes;

obtaining the signal spectrum;

detecting peaks of the signal spectrum on a fractional frequency scale;

estimating a phase of each of the peaks;

deriving a phase adjustment for a time reversed concealment audio subframe based on the phase estimated;

applying the phase adjustment to the peaks of the signal spectrum to form phase adjusted peaks and to form a concealment audio subframe based on the phase adjusted peaks, wherein applying the phase adjustment includes applying a time reversal to the concealment audio subframe;

combining the phase adjusted peaks with a noise spectrum of the signal spectrum to form a combined spectrum for the first subframe window of the second two consecutive subframes; and generating a synthesized concealment audio subframe based on the combined spectrum.

26. A computer program product comprising a non-transitory storage medium including program code to be executed by processing circuitry of a decoder device configured to operate in a communication network, whereby execution of the program code causes the decoder device to perform operations comprising:

generating frequency spectra on a subframe basis where a first subframe of the consecutive subframes is a mirrored version or a time reversed version of a second subframe window of the consecutive subframes;

storing a signal spectrum corresponding to a second subframe window of a first two consecutive subframes;

receiving a bad frame indicator for a second two consecutive subframes;

obtaining the signal spectrum;

detecting peaks of the signal spectrum on a fractional frequency scale;

estimating a phase of each of the peaks;

deriving a phase adjustment for a time reversed concealment audio subframe based on the phase estimated;

applying the phase adjustment to the peaks of the signal spectrum to form phase adjusted peaks and to form a concealment audio subframe based on the phase adjusted peaks, wherein applying the phase adjustment includes applying a time reversal to the concealment audio subframe;

combining the phase adjusted peaks with a noise spectrum of the signal spectrum to form a combined spectrum for the first subframe window of the second two consecutive subframes; and generating a synthesized concealment audio subframe based on the combined spectrum.

* * * * *